United States Patent
Koskinen et al.

(10) Patent No.: US 8,812,382 B2
(45) Date of Patent: Aug. 19, 2014

(54) CHARGING FOR A COMMUNICATION SYSTEM

(75) Inventors: Juha-Pekka Koskinen, Hameenlinna (FI); Juha R. Vallinen, Tampere (FI)

(73) Assignee: Nokia Corporation, Espoo (FI)

( * ) Notice: Subject to any disclaimer, the term of this patent is extended or adjusted under 35 U.S.C. 154(b) by 1213 days.

(21) Appl. No.: 10/448,436

(22) Filed: May 30, 2003

(65) Prior Publication Data

US 2004/0139012 A1     Jul. 15, 2004

Related U.S. Application Data

(60) Provisional application No. 60/440,022, filed on Jan. 15, 2003.

(51) Int. Cl.
| | |
|---|---|
| *G06Q 40/00* | (2012.01) |
| *H04M 17/00* | (2006.01) |
| *H04M 15/00* | (2006.01) |
| *H04W 4/24* | (2009.01) |
| *G06Q 20/10* | (2012.01) |

(52) U.S. Cl.
CPC ............ *H04M 15/745* (2013.01); *H04M 17/00* (2013.01); *H04M 15/77* (2013.01); *H04M 2215/2013* (2013.01); *H04M 2215/78* (2013.01); *H04M 15/63* (2013.01); *H04M 15/82* (2013.01); *H04M 15/57* (2013.01); *H04M 15/00* (2013.01); *H04M 15/8228* (2013.01); *H04M 2215/208* (2013.01); *H04M 2215/2026* (2013.01); *H04M 2215/54* (2013.01); *H04M 2215/22* (2013.01); *H04M 2215/7277* (2013.01); *H04M 2215/7833* (2013.01); *H04M 2215/202* (2013.01); *H04W 4/24* (2013.01); *H04M 2215/32* (2013.01); *H04M 15/772* (2013.01); *H04M 2215/0168* (2013.01); *H04M 2215/018* (2013.01); *H04M 15/7655* (2013.01); *H04M 2215/782* (2013.01); *H04M 15/8214* (2013.01); *H04M 15/8292* (2013.01); *H04M 2215/0108* (2013.01); *G06Q 40/12* (2013.12); *H04M 2215/7263* (2013.01); *G06Q 20/102* (2013.01); *H04M 15/775* (2013.01); *H04M 2215/204* (2013.01); *H04M 15/56* (2013.01); *H04M 2215/7254* (2013.01); *H04M 2215/725* (2013.01); *H04M 15/51* (2013.01)
USPC .................................. 705/35; 705/39; 705/40

(58) Field of Classification Search
USPC ......................................................... 705/35
See application file for complete search history.

(56) References Cited

U.S. PATENT DOCUMENTS

| | | | | |
|---|---|---|---|---|
| 6,829,595 | B2* | 12/2004 | Justice ........................... | 705/64 |
| 7,362,745 | B1* | 4/2008 | Cope et al. .................... | 370/352 |
| 2003/0083988 | A1* | 5/2003 | Reith ............................. | 705/40 |
| 2004/0267965 | A1* | 12/2004 | Vasudevan et al. ........... | 709/250 |

FOREIGN PATENT DOCUMENTS

| | | | |
|---|---|---|---|
| EP | 1 026 853 | A | 8/2000 |
| EP | 1 246 445 | A1 | 10/2002 |

* cited by examiner

*Primary Examiner* — Lalita M Hamilton
(74) *Attorney, Agent, or Firm* — Alston & Bird LLP

(57) ABSTRACT

A communication method for use in a communications system includes at least one user. The method includes a step of establishing a session for permitting a user to communicate with at least one entity. The method also includes the steps of using a first charging method for one part of the session and using a second charging method for a different part of the session.

52 Claims, 2 Drawing Sheets

CHARGING FOR A COMMUNICATION SYSTEM

This nonprovisional application claims the benefit of U.S. Provisional Application No. 60/440,022 filed Jan. 15, 2003.

FIELD OF THE INVENTION

The present invention relates to charging services, in particular but not exclusively, in Internet protocol networks.

BACKGROUND OF THE INVENTION

It has been proposed to provide centralized charging functionality in all-IP (Internet protocol) networks, such as mobile communications networks in which a packet switched cellular network provides access for mobile users to services provided by external IP networks.

Diameter is an IETF (Internet Engineering Task Force) protocol that has been specifically designed for the Internet infrastructure. Diameter unifies authentication, authorization and accounting (AAA) transactions, The accounting related extension of the base Diameter protocol is likely to be used in networks which are all—IP (Internet Protocol) based for charging purposes.

There are two modes of charging. The first is on-line charging which is where the user effectively pre-pays for a data session and the second is off-line charging where a user is billed for a session after the session. Thus the first charging method is implemented by pay-as-you-go systems whereas the second method is implemented where the user is billed at regular intervals for calls which the user has made.

Currently, for a single session, it is only possible to have one method of billing. This is disadvantageous. For example, in a single session a user may access two or more services. However, a common method of billing will need to be used for these services. This could mean that a user would have to end a session for services using one billing method and start a second session for services using a second billing method. Clearly this is inconvenient and time consuming. Where the service in question is access to a particular resource, the access itself may require one billing method while the services provided via the resource may require a second billing method. This would not be possible with the current proposals. This is disadvantageous.

This is also the case for general packet radio services GPRS where each service is either prepaid or postpaid. This means that packet data protocol PDP contexts are either defined as prepaid or as postpaid, according to the charging profile defined in HLR for the subscriber.

SUMMARY OF THE INVENTION

It is an aim of embodiments of the invention to address at least one of the disadvantages or problems discussed above.

According to a first aspect of the present invention there is provided a communication method for use in a Communications system comprising at least one user, said method comprising the steps of establishing a session in which the user is arranged to communicate with at least one entity, using a first charging method for one part of said session, and using a second charging method for a different part of said session.

According to a second aspect of the present invention there is provided a communications system comprising at least one user, at least one entity with which the user is arranged to communicate in a session, and charging means for causing the user to be charged by a first charging method for one part of said session and by a second charging method for a different part of said session.

According to a third aspect of the present invention there is provided a charging means for use in a communications system in which a user is arranged to establish a session with at least one entity, said charging means being arranged to cause the user to be charged by a first charging method for one part of said session and by a second charging method for a different part of said session.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE INVENTION

The present invention is described herein with reference to a particular illustrative embodiment. However, such embodiment is presented for the purposes of illustrating the present invention, and does not limit the scope thereof.

In particular, the present invention is described herein with reference to a particular example of a UMTS network supporting user equipment, such as a mobile station, and providing connections for the user equipment to external IP networks.

Figure 1:
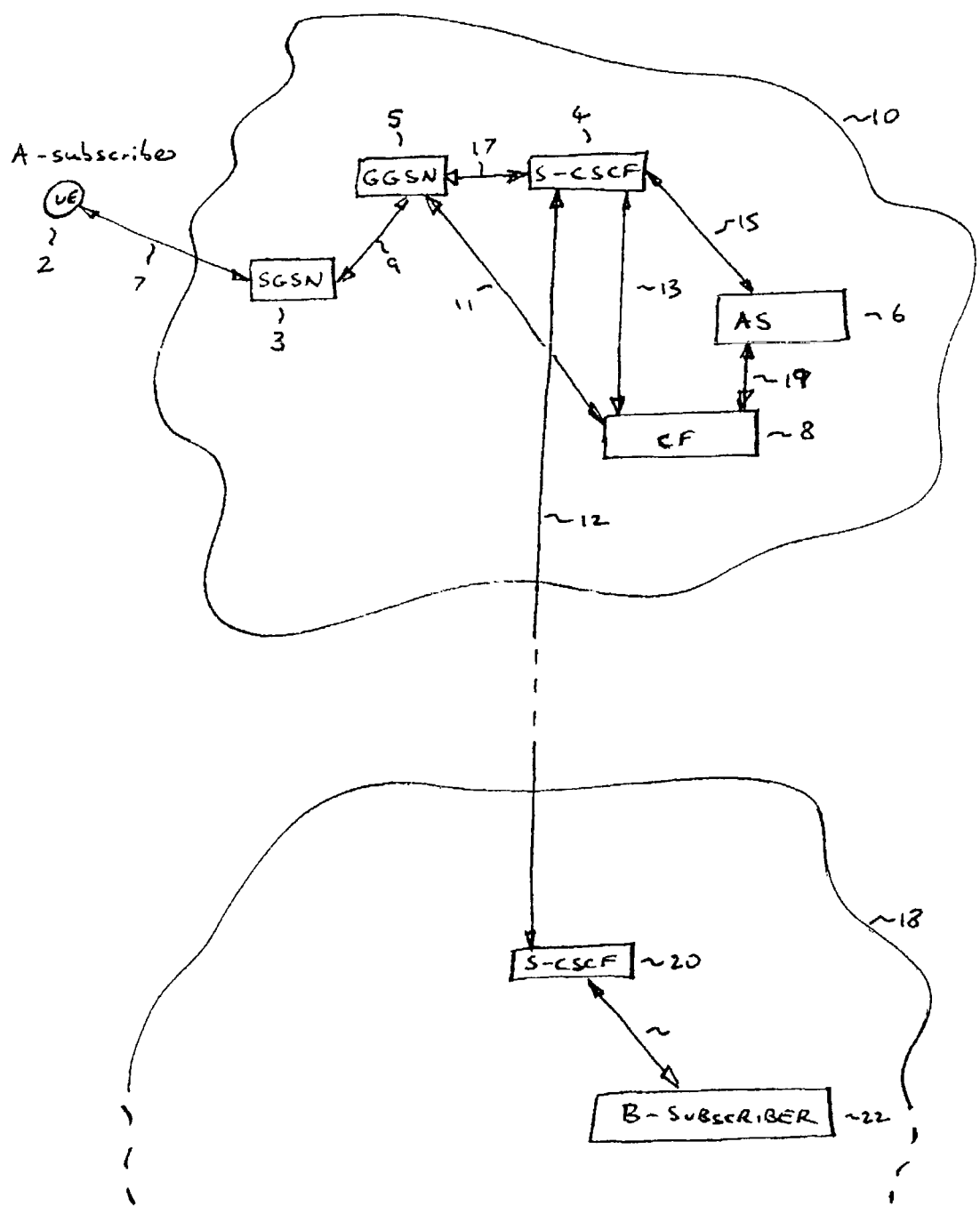
FIG. 1 illustrates the main network elements in an example implementation of the present invention.

Referring to FIG. 1, there is illustrated the main elements of a UMTS network implementing an all-IP Diameter protocol system for the purposes of describing the present invention. In FIG. 1 only those elements of a UMTS system necessary for supporting the Diameter protocol charging in accordance with an embodiment of the present invention are illustrated. The full implementation of such a system will be apparent to one skilled in the art.

FIG. 1 illustrates generally a UMTS network infrastructure 10 including a serving GPRS support node (SGSN) 3, a gateway GPRS support node (GGSN) 5, a serving call state control function (S-CSCF) 4, a charging framework (CF) 8 preferably including a combined charging collector function (CCF) and online charging system (OCS), and an application server (AS) 6. It should be appreciated that in alternative embodiments of the invention, the online charging system OCS and the charging collector function CCF may be provided in different entities. The online charging function may be provided by an online service controller OSC which may be part of the CF or a separate entity. The on-line charging function is provided by the OCS whilst the off line charging function is provided by the CCF.

The SGSN 3 provides access over the radio access network for user equipment UE 2 to the UMTS network 10. The SGSN 3 is connected to the GGSN 5 by a link 9. The GGSN is connected to the S-CSCF 4 by a link 17. The SGSN and the GGSN represent the packet switched domain of the network 10 of FIG. 1. They provide control and transfer of packets between the UE 2 and applications provided in the network 10 or in other external networks.

The S-CSCF 4 supports a call session for the user equipment, such as user equipment 2, connected in the UMTS network 10. The CF 8 provides the centralized charging function for on-line and off-line charging, and is connected to the S-CSCF 4 by communication link 13. The CF 8 is additionally connected to the GGSN 5 and the AS 6 by respective communication links 11 and 19. The AS 6 is connected to the S-CSCF 4 by communication links 15.

It should be noted that the elements and connections shown in FIG. 1 are for the purposes of illustrating an exemplary embodiment of the invention only, and one skilled in the art will fully understand the implementation of a UMTS network 10.

The S-CSCF 4 additionally has a connection 12 to an IP network or element of an IP network external to the UMTS network 10. In particular, the connection 12 connects to a service provider or terminating part with which the user equipment 2 may establish a session.

The universal mobile telecommunication system UMTS network provides access to other, external IP services or networks for the user equipment 2. For the purposes of the present example, it is assumed that a call session is to be established between the user equipment 2, and a service provider or further user equipment which may be part of the same network or a part of a different network as the user equipment 2.

B-subscriber 22 is in a further IF network 18. The further IF network 18 supports the call session for the B-subscriber 22 with a serving call state control function (S-CSCF) 20. The B-subscriber may, for example, be further user equipment or a service provided by a third party.

The protocol interfaces for the various IP network elements of FIG. 1 may be implementation dependent. In a preferred embodiment the S-CSCF 4 is connected to the AS 6 via an ISC interface. The ISC interface may, for example, be a session initiation protocol (SIP). The CF 8 is preferably connected to the S-CSCF 4 via a Diameter protocol. The CF 8 is preferably connected to the AS 6 via a Diameter protocol.

Figure 2:
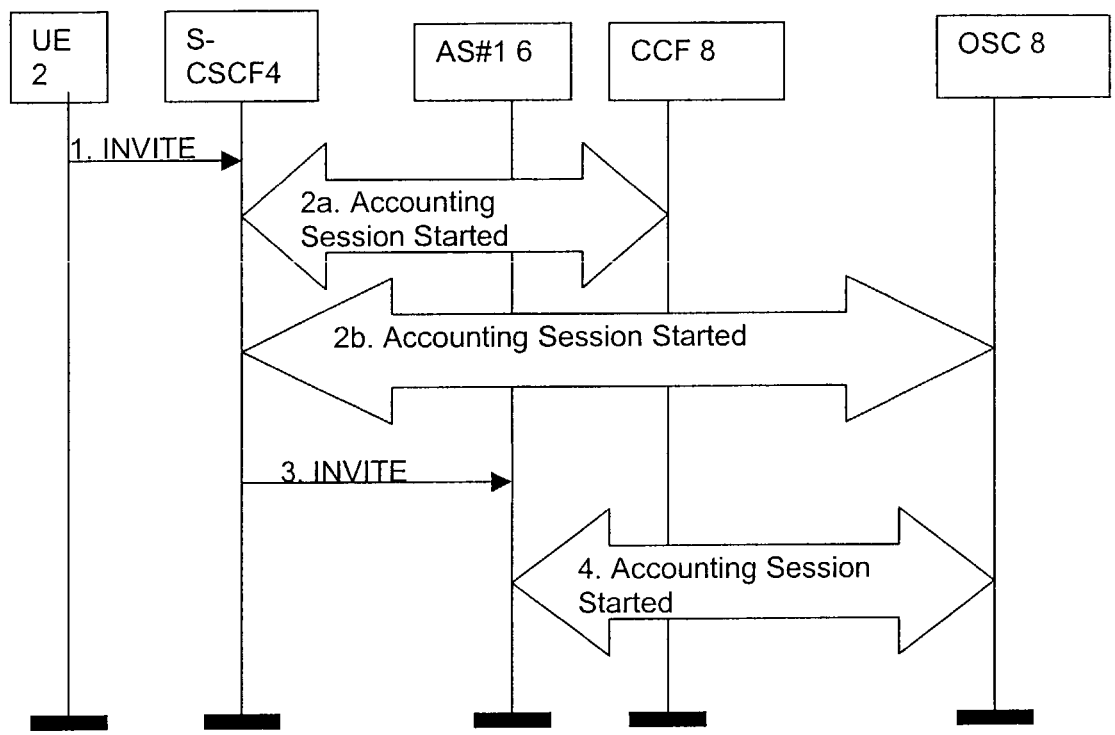
FIG. 2 illustrates the signaling in a preferred embodiment of the present invention.

Reference will now be made to FIG. 2 which shows a signal flow diagram which illustrates embodiments of the present invention. The same reference numerals as used in relation to FIG. 1 are used in FIG. 2. In summary, the arrangement of FIG. 2 shows a single session in which two different methods of charging are used. It should be noted that one data session thus can generate several accounting sessions.

In step 1, a SIP INVITE message is sent from the user equipment 2 to a serving call state control function S-CSCF 4. The INVITE message represents the initiation of an active communication session by the UE 2.

In step 2, an accounting session is started with a Diameter Accounting Request ACR message. There are two alternatives which may be used in embodiments of the invention. In both of these alternatives, it is assumed that this accounting session is to be a post-paid or off-line accounting session. Steps 2a and 2b represent two different ways in which embodiments of the present invention can be implemented.

In step 2a, the IMS (IP Multimedia Subsystems) specific charging method, that is whether the charging method is prepaid (on-line charging) or postpaid (off-line charging), has been downloaded to a SPD (Subscriber Profile Database) where it could be downloaded to the S-CSCF every time when session is established during registration. Registration is done with SIP. In this step, a post charging method is used for the INS accounting session and the CCF is contacted. In other words, the service provided is an access service.

As an alternative to step 2a, Step 2b is carried out. In this step, the IMS specific charging method, that is whether the charging method is prepayment or post-payment stored in the OSC. In an accounting answer ACA the information is returned to S-CSCF 4, the online accounting session is released and an offline session started with a new ACR as in step 2a.

It should be appreciated that for offline or post payment, an accounting session between the S-CSCF 4, the relevant application server if appropriate, and the CCF is established.

Steps 1 and 2 represent the establishment of a first accounting session.

In step 3, an SIP INVITE message is sent from S-CSCF to the application server, Steps 3 and 4 represent the establishment of a second accounting session, different from that set up in steps 1 and 2. Steps 1 to 4 do however all take place within a single session.

In step 4, the next accounting session is again started with Diameter ACR message As with step 2, two alternatives which can be used in embodiments of the present invention will be now be set out as steps 4a and 4b. Step 4 represents the setting of a second accounting session where a prepayment method is to be used. This means that an account session between the S-CSCF, an application server where appropriate, and the OSC is to be established.

In step 4a, the AS specific charging method, that is whether on-line or off-line charging is to be used, is stored in the application server AS. In this step, a prepayment method is used for the application server accounting session, and the OSC is contacted.

In step 4b, which is an alternative to step 4a, the AS specific charging method to be used is stored in the OSC. In the ACA, the information relating to the required charging method is returned to the application server AS 6, and the online accounting session continues.

If application specific charging method information is stored in the OSC (as in steps 2b and 4b), the accounting session will always be established with OSC as a default. The OSC will inform in the ACA which charging method should be used. This means that either the online accounting session continues as in the case of step 4b or is released and replaced with an offline accounting session as in the case of step 2b. In alternative embodiments of the invention, the entity responsible for off-line charging maybe the default entity.

In the case of steps 2a and 4a, the charging method information is delivered between IMS nodes inside SIP messages when registration is done.

In preferred embodiments of the invention, the diameter ACA message will have a new attribute value pair AVP Charging-Method. Where there are two charging values a single bit is required with for example the values 0 for postpayment and 1 for pre-payment or vice versa.

The charging addresses for online (ECF Event Charging Function) and offline (CCF) charging collection has been defined in 3GPP specifications (3rd generation partnership project) such as 3GPP TS 24.229 which is hereby incorporated by reference.

Thus, the application specific charging information could be added to SIP response messages, service specific data can be retrieved by OSC or CF and/or could be added to Diameter messages.

The advantage of embodiments of this invention is that it is possible to define services which always require prepaid functionality even if the subscriber is postpaid subscriber and vice versa. It is also possible to define that certain services, for example access are charged with postpaid method while others for example services are charged with prepaid method. Thus it is possible to select a charging method for each service inside one data session. In a single session, one application may require prepaid whilst for others only post-payment is required. For example a user usually uses a post-payment method. However for certain types of call such as premium services or international calls, the user may use an online payment method.

It should be appreciated that the question as to whether or not a user is to be charged by an on-line charging method or an off line charging method may depend on at least one of the following:

The user—that is the user can choose the charging method;
The terms of the users subscription;
The network operator to which the user subscribes or is currently attached; and
The service provider.

In the example described in relation to FIG. 2, two different methods of charging are discussed—on-line and off-line payment. It should be appreciated that embodiments of the present invention may use any two types of charging method. For example, embodiments of the invention may be used with two different types of on-line payment method or two different types of off-line payment method. Embodiments of the present invention can also be used with more than two different types of charging method.

Embodiments of the present invention permit different charging methods depending on the charging function addresses.

Embodiments of the present invention are particularly applicable to communication systems which use SIP protocols. However, it should be appreciated that embodiments of the present invention can be used with any suitable network using any suitable protocol. Embodiments of the present invention are particularly applicable to embodiments where the user equipment is attached to the network via a wireless connection. However it should be appreciated that embodiments of the present invention are also applicable to systems where the user equipment is attached to the network via a wired connection.

The user equipment can take any suitable form and may for example be a mobile telephone, mobile station, personal digital assistant, laptop computer, portable computer, computer or any other suitable equipment.

Embodiments of the present invention have been described in relation to a UMTS telecommunications network, It should be appreciated that embodiments of the present invention can be used with other networks using any other standard. Embodiments of the present invention have been described in relation to a wireless telecommunications network. It should be appreciated that embodiments of the present invention may also be used in relation to a wired communications network.

The present invention is described herein with reference to examples of preferred embodiments for the purpose of illustration, and is not limited to any such embodiments. The scope of the present invention is defined by the appended claims.

We claim:

1. A method, comprising:
    identifying, by a device comprising a processor and memory combined with the processor, a single communication session for permitting a user to communicate with at least one entity, wherein the single communication session is initiated by an invitation message;
    establishing a single connection to a network for the single communication session;
    using, by the device, a first charging method for one part of said single communication session, said one part comprising a first plurality of packets of a first service, wherein said first charging method comprises on-line charging;
    using, by the device, a second charging method for a different part of the same single communication session, said different part comprising a second plurality of packets of a second service, wherein said second charging method comprises off-line charging, wherein the first charging method and the second charging method are used during the same connection to the network over which the single communication session occurs;
    categorizing, by the device, packets to the first and second pluralities based on their content; and
    communicating, by the device, billing information based on the using of the first charging method and the using of the second charging method.

2. The method of claim 1, wherein at least two different charging methods are associated with the single communication session.

3. The method of claim 1, further comprising:
    providing a plurality of services in said single communication session.

4. The method of claim 3, further comprising:
    associating at least one of said plurality of services with the first charging method; and
    associating another of said plurality of services with the second charging method.

5. The method of claim 1, further comprising:
    associating one of the first and second charging methods with an access service; and
    associating another of the first and second charging methods with a different service.

6. The method of claim 1, wherein the single communication session comprises an internet protocol based communication session.

7. The method of claim 6, wherein the internet protocol based communication session supports a Diameter internet protocol.

8. The method of claim 1, further comprising:
    providing a plurality of accounting sessions in said single communication session.

9. The method of claim 8, further comprising:
    starting each accounting session with a Diameter accounting request.

10. The method of claim 1, further comprising:
    storing information relating to one of the first charging method and the second charging method in a provider of a service provided in said single communication session.

11. The method of claim 1, further comprising:
    storing information relating to one of the first charging method and the second charging method in a charging entity.

12. The method of claim 11, wherein said charging entity is responsible for charging in accordance with said one of said first charging method and second charging method.

13. The method of claim 11, wherein said charging entity is responsible for charging in accordance with on-line charging.

14. The method of claim 1, further comprising:
    providing information relating to one of the first charging method and the second charging method in at least one registration message.

15. The method of claim 14, wherein said registration message comprises a session initiation protocol message.

16. The method of claim 1, further comprising:
    providing information relating to one of the first the charging method and the second charging method in a diameter message.

17. The method of claim 16, wherein said diameter message comprises a diameter accounting answer message.

18. The method of claim 1, further comprising:

providing information relating to one of the first charging method and the second charging method in an attribute value pair.
19. The method of claim 1, further comprising:
providing information relating to one of the first charging method and the second charging method to be used.
20. The method of claim 1, further comprising:
storing information relating to one of the first charging method and the second charging method to be used.
21. The method of claim 1, further comprising:
establishing a connection with a first charging function within the single communication session when the first charging method is to be used; and
establishing a connection with a second charging function within the single communication session when the second charging method is to be used.
22. The method of claim 21, wherein one of said first charging function and said second charging function is a charging collection function and another of said one of said first charging function and said second charging function is a online charging function.
23. The method of claim 21, further comprising:
storing information as to one of the first charging method and the second charging method in one of said first charging and second charging function; and
establishing a connection with said one of said first charging and second charging functions as a default.
24. The method of claim 1, wherein said at least one entity comprises one of an application server and another user.
25. A system comprising:
a packet network;
a charging entity comprising: a first charging module comprising a processor and memory combined with the processor configured to cause said at least one user to be charged by a first charging method for one part of a single communication session between the at least one user and the at least one entity, said one part comprising a first plurality of packets, wherein the single communication session is initiated by an invitation message; and
a second charging module comprising a processor and memory combined with the processor configured to cause the user to be charged by a second charging method for a different part of said same single communication session, said different part comprising a second plurality of packets,
wherein said first charging method comprises on-line charging, wherein said second charging method comprises off-line charging, wherein said charging entity is configured to categorize packets to the first and second pluralities based on their content, and wherein the first charging method and the second charging method are both used during a singlular connection to the packet network over which the single communication session occurs.
26. An apparatus, comprising:
a first charging module comprising a processor and memory combined with the processor configured to cause a user to be charged by a first charging method for one part of a single communication session between the user and at least one other entity, said one part comprising a first plurality of packets, wherein the single communication session is initiated by an invitation message; and
a second charging module comprising a processor and memory combined with the processor configured to cause the user to be charged by a second charging method for a different part of said same single communication session, said different part comprising a second plurality of packets,
wherein said first charging method comprises on-line charging, wherein said second charging method comprises off-line charging, wherein said apparatus is configured to categorize packets to the first and second pluralities based on their content, and wherein the first charging method and the second charging method are both used during a singular connection to a network over which the single communication session occurs.
27. The apparatus of claim 26, wherein the first charging module comprises a first charging function for said first charging method and the second charging module comprises a second charging function for said second charging method.
28. The apparatus of claim 26, wherein at least two different charging methods are associated with a single communication session.
29. The apparatus of claim 26, wherein a plurality of services are provided in said single communication session.
30. The apparatus of claim 29, further comprising:
a first associater configured to associate at least one of said plurality of services with the first charging method; and
a first associater configured to associate another of said plurality of services with the second charging method.
31. The apparatus of claim 26, further comprising:
a first associater configured to associate one of the first and second charging methods with an access service; and
a second associater configured to associate another of the first and second charging methods with a different service.
32. The apparatus of claim 26, wherein the apparatus is configured to operate in an internet protocol based communication system.
33. The apparatus of claim 32, wherein the apparatus supports a Diameter internet protocol.
34. The apparatus of claim 26, wherein a plurality of accounting sessions are provided in said single communication session.
35. The apparatus of claim 34, wherein each accounting session is started with a Diameter accounting request.
36. The apparatus of claim 26, further comprising:
a memory configured to store an association with information relating to one of the first charging method and the second charging method, said information being stored in a provider of a service provided in said single communication session.
37. The apparatus of claim 26, further comprising:
a memory configured to store information relating to at least one of the first charging method and the second charging method.
38. The apparatus of claim 37, wherein at least one of said charging modules is responsible for charging in accordance with a respective one of said first charging method and second charging method.
39. The apparatus of claim 37, wherein said apparatus is responsible for charging in accordance with on-line charging.
40. The apparatus of claim 26, further comprising:
a provider configured to provide information relating to one of the first charging method and the second charging method in at least one registration message.
41. The apparatus of claim 40, wherein said registration message comprises a session initiation protocol message.
42. The apparatus of claim 26, further comprising:
a provider configured to provide information relating to one of the first the charging method and the second charging method in a diameter message.

43. The apparatus of claim 42, wherein said diameter message comprises a diameter accounting answer message.

44. The apparatus of claim 26, further comprising:
a provider configured to provide information relating to one of the first charging method and the second charging method in an attribute value pair.

45. The apparatus of claim 26, further comprising:
a provider configured to provide information relating to one of the first charging method and the second charging method to be used.

46. The apparatus of claim 26, further comprising:
a memory configured to store information relating to one of the first charging method and the second charging method to be used.

47. The apparatus of claim 26, further comprising:
a communicator configured to establish a connection with a first charging function when the first charging method is to be used; and
a communicator configured to establish a connection with a second charging function when the second charging method is to be used.

48. The apparatus of claim 47, wherein one of said first charging function and said second charging function is a charging collection function and another of said one of said first charging function and said second charging function is a online charging function.

49. The apparatus of claim 47, wherein said communicator is configured to establish a connection with said one of said first charging and second charging functions as a default.

50. The apparatus of claim 26, wherein said at least one other entity comprises one of an application server and another user.

51. An apparatus, comprising:
first charging means comprising a processor and memory combined with the processor for causing a user to be charged by a first charging method for one part of a single communication session between the user and at least one other entity, said one part comprising a first plurality of packets, wherein the single communication session is initiated by an invitation message; and
second charging means comprising a processor and memory combined with the processor for causing the user to be charged by a second charging method for a different part of said same single communication session, said different part comprising a second plurality of packets,
wherein said first charging method comprises on-line charging, wherein said second charging method comprises off-line charging, wherein said apparatus comprises means for categorizing packets to the first and second pluralities based on their content, and wherein the first charging method and the second charging method are both used during a singular connection to a network over which the single communication session occurs.

52. A system comprising:
a packet network;
a charging entity comprising: first charging means comprising a processor and memory combined with the processor for causing said at least one user to be charged by a first charging method for one part of a single communication session between the user and at least one other entity, said one part comprising a first plurality of packets, wherein the single communication session is initiated by an invitation message; and
second charging means comprising a processor and memory combined with the processor for causing said at least one user to be charged by a second charging method for a different part of said same single communication session, said different part comprising a second plurality of packets,
wherein said first charging method comprises on-line charging, wherein said second charging method comprises off-line charging, wherein said charging entity comprises means for categorizing packets to the first and second pluralities based on their content, and wherein the first charging method and the second charging method are both used during a singular connection to the packet network over which the single communication session occurs.

* * * * *